US012227019B1

(12) United States Patent
Kraft et al.

(10) Patent No.: US 12,227,019 B1
(45) Date of Patent: Feb. 18, 2025

(54) DUPLEX PRINTABLE COMBO FORM WITH WRISTBAND AND LABELS

(71) Applicant: Rekon, LLC, Pittsburg, KS (US)

(72) Inventors: Roger Kraft, Fort Scott, KS (US); Gina Staudinger, Louisburg, KS (US); Luke Bukowski, Fort Scott, KS (US)

(73) Assignee: Rekon, LLC, Pittsburg, KS (US)

( * ) Notice: Subject to any disclaimer, the term of this patent is extended or adjusted under 35 U.S.C. 154(b) by 0 days.

(21) Appl. No.: 18/306,865

(22) Filed: Apr. 25, 2023

Related U.S. Application Data

(60) Provisional application No. 63/363,557, filed on Apr. 25, 2022.

(51) Int. Cl.
*B42D 15/00* (2006.01)
*G09F 3/00* (2006.01)

(52) U.S. Cl.
CPC ......... *B42D 15/0053* (2013.01); *G09F 3/005* (2013.01); *B42P 2221/06* (2013.01); *B42P 2241/22* (2013.01)

(58) Field of Classification Search
CPC ..... B42D 15/0053; B42D 15/00; G09F 3/005; G09F 3/00; B42P 2241/22
USPC .. 283/72, 74, 75, 81, 94, 98, 100, 101, 108, 283/900
See application file for complete search history.

(56) References Cited

U.S. PATENT DOCUMENTS

2009/0193701 A1* 8/2009 Greer .................... G09F 3/0288 283/81
2012/0210620 A1* 8/2012 Jain ......................... G09F 3/005 40/633

* cited by examiner

*Primary Examiner* — Justin V Lewis
(74) *Attorney, Agent, or Firm* — AVEK IP, LLC

(57) ABSTRACT

A business form may include a first ply and a second ply coupled thereto, each ply having an upper portion and a lower portion. A wristband is die cut into the second ply upper portion and releasably secured to the first ply, the wristband having a printable central portion and a strap portion. A plurality of compound elements is located in the second ply lower portion, each compound element comprising a release liner area and a die cut label area, the label area having an alert label disposed thereon, the alert label being bounded by the release liner area. A plurality of chart labels are disposed on the first ply lower portion, the chart labels being releasably secured to the form.

13 Claims, 7 Drawing Sheets

DUPLEX PRINTABLE COMBO FORM WITH WRISTBAND AND LABELS

CROSS REFERENCE TO RELATED APPLICATIONS

This application claims priority to U.S. Provisional Patent Application No. 63/363,557, filed Apr. 25, 2022, the disclosure of which is incorporated herein in its entirety by reference.

FIELD OF THE DISCLOSURE

The disclosure relates generally to the field of forms comprising wristbands and labels. More specifically, the disclosure relates to forms comprising wristbands and labels usable in the medical industry for identification and/or association of information with a patient.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In some aspects, the techniques described herein relate to a business form including: a first ply having a first ply upper portion and a first ply lower portion; a second ply coupled to the first ply, the second ply having a second ply upper portion and a second ply lower portion; a wristband die cut into the second ply upper portion, the wristband having a central portion and a strap portion, the wristband being releasably secured to the first ply upper portion; a printable area disposed on the central portion, the printable area being configured to receive indicia from a printer; a plurality of compound elements located in the second ply lower portion, each compound element including a release liner area and a die cut label area, the label area having an alert label disposed thereon, the alert label being bounded by the release liner area; and a plurality of chart labels disposed on the first ply lower portion, the chart labels being releasably secured to the form.

In some aspects, the techniques described herein relate to a medical form for conveying information related to a medical patient, the form including: a first side having a first side upper portion and a first side lower portion; a second side having a second upper portion and a second side lower portion; a wristband wearable by a medical patient, the wristband being die cut into the second side upper portion, the wristband having a central portion and a strap portion; a first printable area disposed in the central portion on the first side, the printable area being configured to receive an indicia from a printer; a plurality of alert labels disposed on the second side, each of the plurality of alert label corresponding to a characteristic of a user and being selectively detachable from the form; and a plurality of chart labels disposed on the first side lower portion, each of the plurality of chart labels being releasably secured to the form; wherein at least the second side upper portion is made of polyester.

BRIEF DESCRIPTION OF THE SEVERAL VIEWS OF THE DRAWINGS

Illustrative embodiments of the present disclosure are described in detail below with reference to the attached drawing figures.

DETAILED DESCRIPTION

Business forms comprising wristbands and chart labels are generally known in the art. Typically, the wristband and chart labels are each releasably secured to the business form and may be removed or disassociated from the form for use. Business forms of this type are commonly used in medical professions and may be used for the purposes of patient identification and/or association of certain conditions or information with a patient. Examples of existing business forms are shown in FIGS. 1-4.

Figure 1:
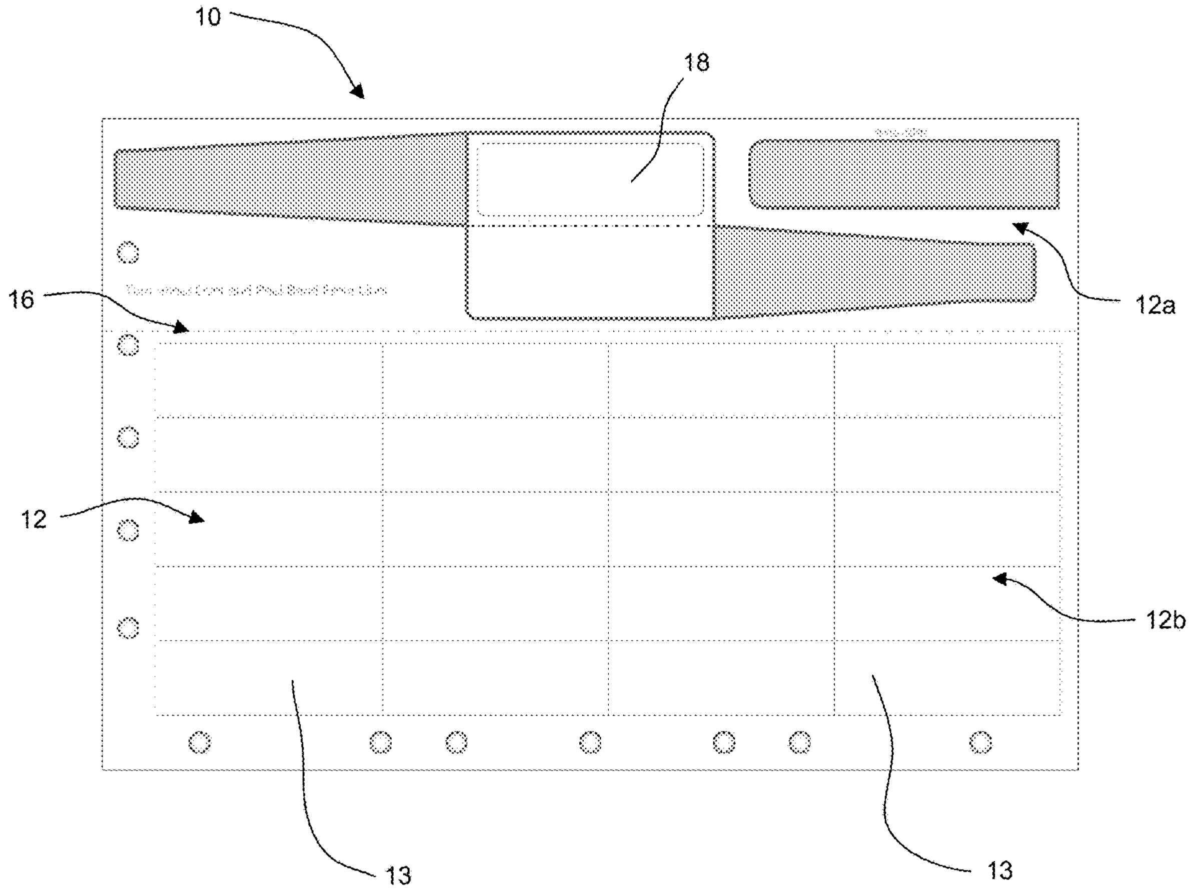
FIG. 1 PRIOR ART
FIG. 1 is a front view of a PRIOR ART wristband and chart label form.
Figure 2:
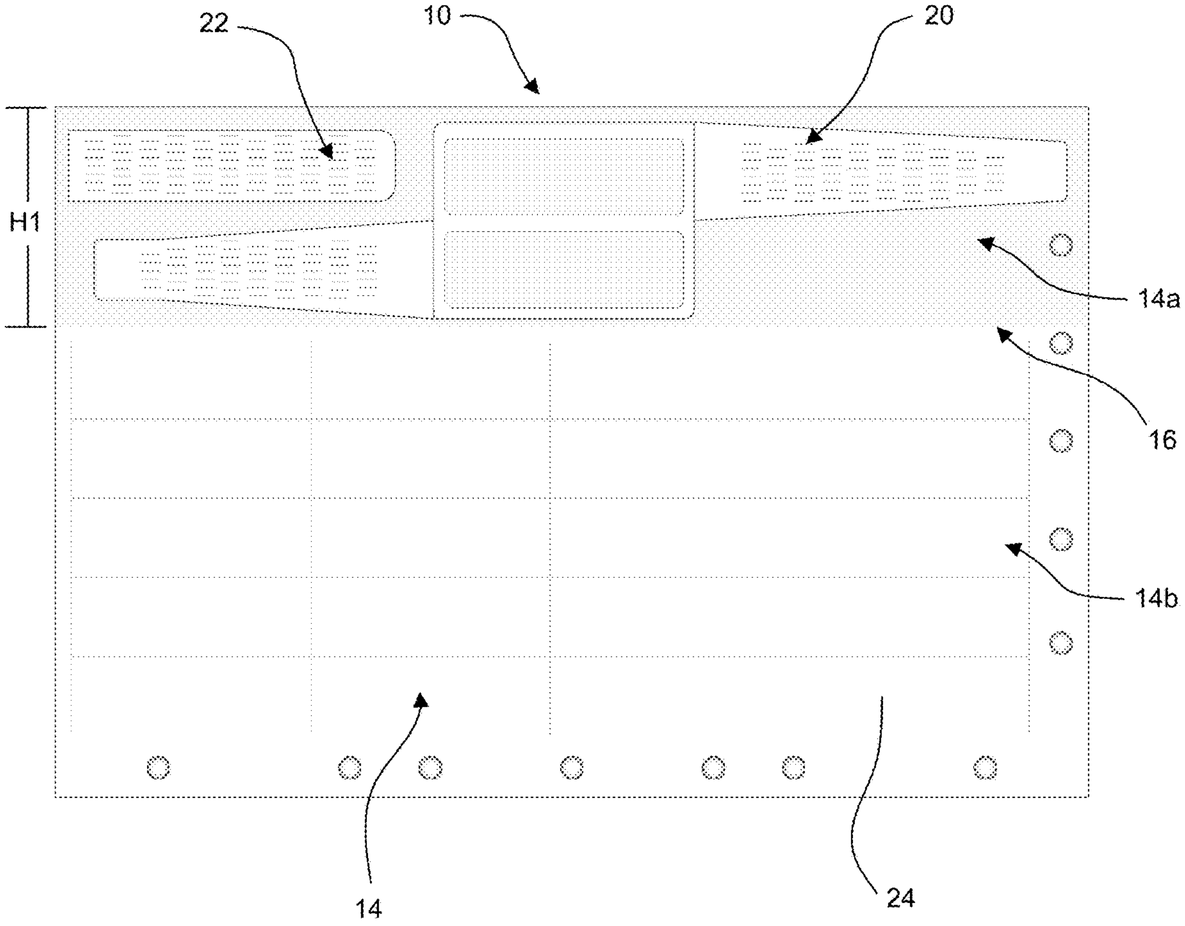
FIG. 2 PRIOR ART
FIG. 2 is back view of the PRIOR ART wristband and chart label form of FIG. 1.

Referring to FIGS. 1 and 2, a preexisting wristband and chart label form 10 is shown. The prior art form 10 includes a front side 12 shown in FIG. 1, and a back side shown in FIG. 2. Referring to FIG. 1 specifically, the front side 12 of form 10 is formed of a paper ply, and is divided into an upper portion 12*a* and a lower portion 12*b*. This division may be achieved or denoted by a perforation or line of weakness 16 which extends substantially along the entire width of the form 10.

The upper portion 12*a* comprises a printed outline of a wristband that is located in the primarily on the back side 14. The wristband includes a printable area 18, which is disposed in a central portion of the wristband. Various indicia may be printed on the printable area 18, by a suitable printer, e.g., an inkjet printer. When the wristband on the back side 14 is disassociated from form 10 the printable area 18 is simultaneously removed, leaving a void in the form 10 in its place. The lower portion 12*b* includes a plurality of chart labels 13, which may be arranged in a grid as shown in the illustrated embodiment.

Referring now to FIG. 2, the back side 14 of the prior art form 10 is shown. Similar to the front side 12, the back side 14 includes an upper portion 14*a* and a lower portion 14*b* which correspond to upper and lower portions 12*a* and 12*b*, respectively. The upper portion 14*a* and the lower portion 14*b* are separated by the same perforation or line of weakness 16 as the upper and lower portions 12*a* and 12*b*.

The back side upper portion 14*a* comprises suitable synthetic materials, e.g., polyester. A wristband 20 is die cut into the polyester and is removable from the form 10 along the die cuts. The form 10 may additionally include a wristband extender 22, which may be similarly die cut into the polyester and be removeable from the form 10.

The back side upper portion 14*a* may be releasably coupled to the front side upper portion 12*a*. Specifically, the inboard surface of the back side upper portion 14*a* may be releasably coupled to the inboard surface of the front side upper portion 12*a* using an adhesive material, for example silicone. In embodiments, the inboard surface of the polyester may be permanently coupled to the inboard surface of the front side upper portion 12*a* by adhesive and the release material may be selectively provided only within the confines of the wristband 20 and the extender 22. In these embodiments, the polyester section may be affixed permanently to the back of the front side upper portion 12*a* generally permanently, except that silicone or a similar release material may be provided within the areas comprising the wristband 20 and the extender 22 to allow the wristband 20 and extender 22 to be selectively disassociated from the form 10 for use.

The polyester section on the back side 14 has a height H1, and a width extending generally the width of the form 10. The height H1 may be approximately one-third of the height of the form 10 (as in the illustrated embodiment), although in other embodiments the height H1 may vary.

The back side lower portion 14*b* generally comprises a paper liner 24. The chart labels 13 located on the front side 12 are releasably secured to the paper liner using adhesive and a release material.

While the form 10 shown in FIGS. 1 and 2 is an example of a particular wristband and label form configuration, one skilled in the art will appreciate that many variations and configurations of such forms are available. One wristband and label chart form may differ from another form by virtue of a differently configured wristband.

Figure 3:
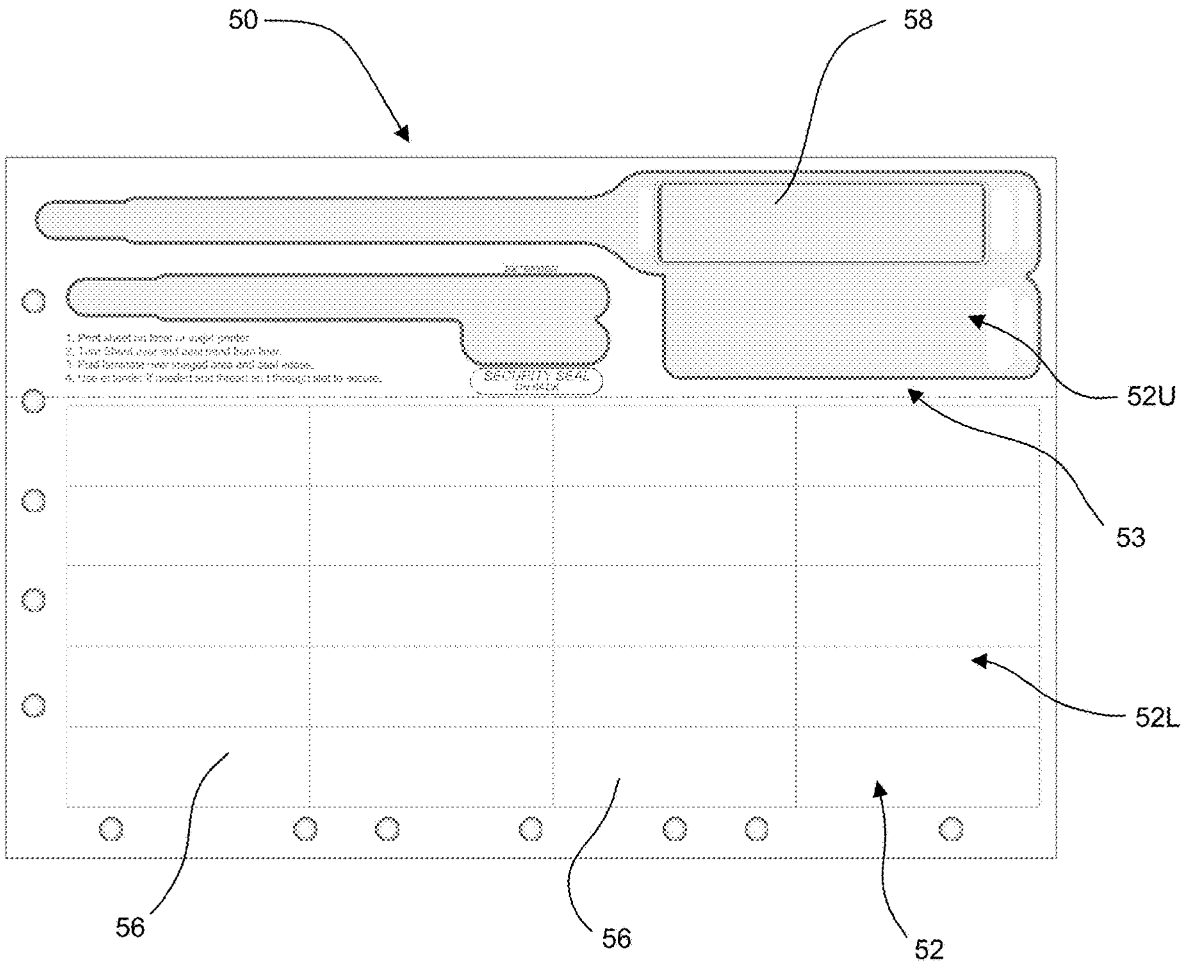
FIG. 3 PRIOR ART
FIG. 3 is a front view of another PRIOR ART wristband and chart label form.
Figure 4:
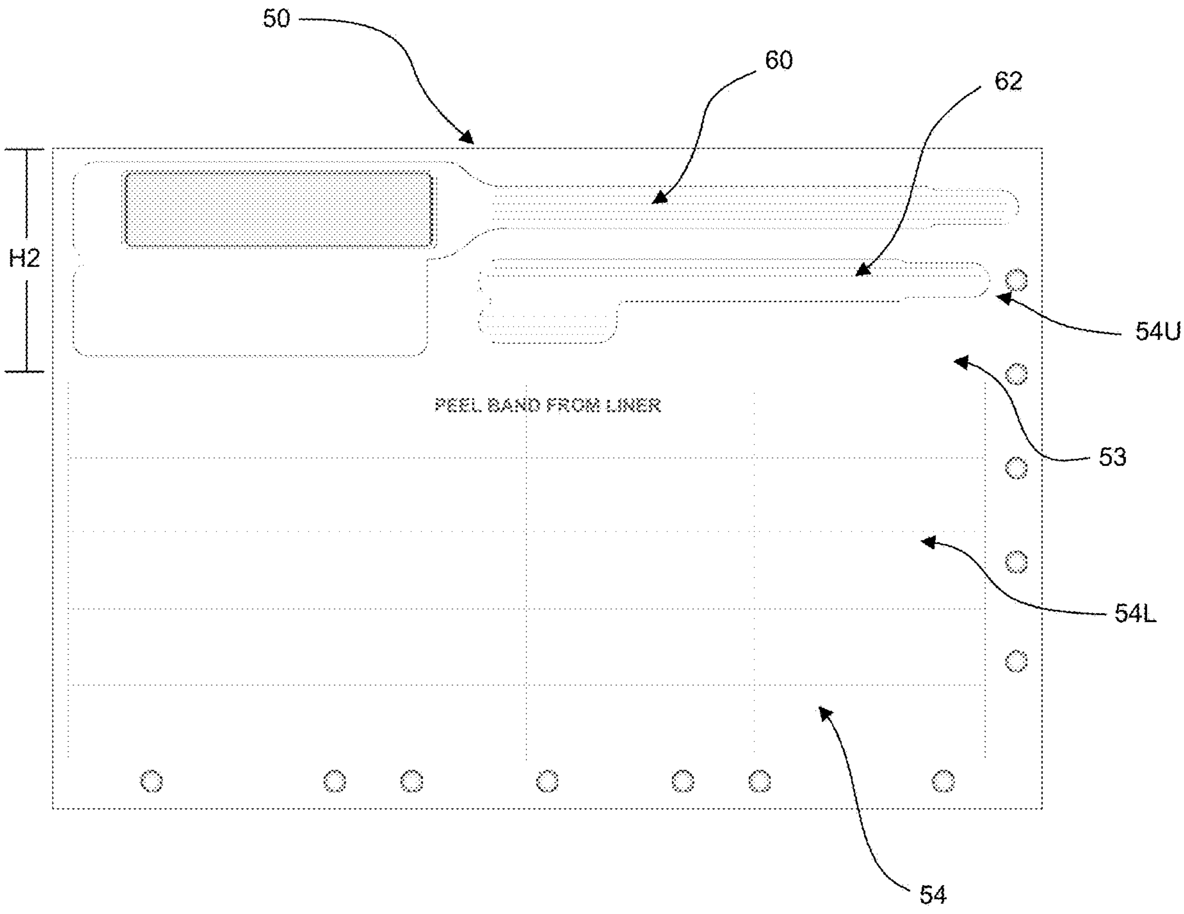
FIG. 4 PRIOR ART
FIG. 4 is a back view of a PRIOR ART wristband and chart label form of FIG. 3.

Turning now to FIGS. 3 and 4, another prior art wristband and label form 50 is shown. The form 50 includes a front side 52 and a back side 54. Similar to form 10, the front side 52 of form 50 includes an upper portion 52*a* and a lower portion 52*b*, separated by a perforation or line of weakness 56. The back side 54 similarly includes an upper portion 54*a* and a lower portion 54*b* which correspond to the front side upper and lower portions 52*a* and 52*b*, and are also separated by the perforation or line of weakness 56.

The front side upper portion 52*a* includes a printable area 58 contained within indicia outlining a wristband 60. The printable area 58 can be printed upon from the front side 52 of the form 50, and when the wristband 60 is disassociated from the form 50 on the back side 54, the printed area is simultaneously disassociated with the form 50. The front side upper portion 52*a* also includes a wristband extender 62 which may be disassociated from the form 50 similarly to the wristband 60. The lower front portion 52*b* includes a plurality of chart labels 53, which are releasably secured to a liner 64 on the back side 54 of the form 50. Similar to the form 10, the chart labels 53 may be arranged within a grid, of varying size and/or number.

On the back side 54 of the form 50, the upper portion 54*a* comprises polyester or a similar synthetic material, with the wristband 60 and the wristband extender 62 being defined in the polyester using die cuts. The upper portion 54*a* has a height H2 ands a width extending substantially along the width of the form 50. The height H2 may be substantially equal to the height H1.

The prior art forms 10 and 50 are similar in many aspects. For example, each form has a front side formed of a paper ply, a back side formed a polyester section and a paper section (i.e., the chart label liner), a removable wristband defined by die cuts in the polyester section, and so on. Primary differences between the forms 10 and the form 50 may relate to the configuration of the wristbands 20 and 60. For example, the wristband 60 has a solitary strap that extends to one side of the printable area 58, whereas the wristband 20 has two straps that extend on opposite sides of the printable area 18. Further, the printable area 58 is devoid of paper and is instead formed by printable coating (i.e., the polyester of the wristband is coated with a printable coating to define the area on which patient-specific indicia will be printed). Many other variations of wristband and chart labels forms are known.

Prior art wristband and label forms (e.g., forms 10 and 50) may comprise a wristband or a plurality of wristbands, along with an extender and a number of chart labels. A medical professional or staff may employ such a wristband to identify the patient, and use chart labels to indicate information about the patient (e.g., test results or conditions). The artisan understands that other types of additional labels, such as alert labels and blood labels, are typically used to indicate additional information about the patient. These additional alert labels and blood labels are generally provided separately, e.g., on two different forms.

However, it may be disadvantageous to provide additional labels such as alert labels and/or blood labels separately from the wristband and chart label form. First, the medical professional has to coordinate more than one form for a solitary patient (e.g., one form comprising the wristband and chart labels, and one or more additional forms comprising the alert labels and/or the blood labels). This increases the chance of mismatch—i.e., increases the likelihood that an alert label or blood label is associated with the wrong patient. Second, in an industry where efficiency and time savings are key, printing these various labels on different forms needlessly increases the time it takes for the medical professional to use these labels. It may therefore be advantageous to include additional labels, such as alert labels and/or blood labels, with the wristband and chart label forms, and the systems and methods for so doing are described herein.

Figure 5:
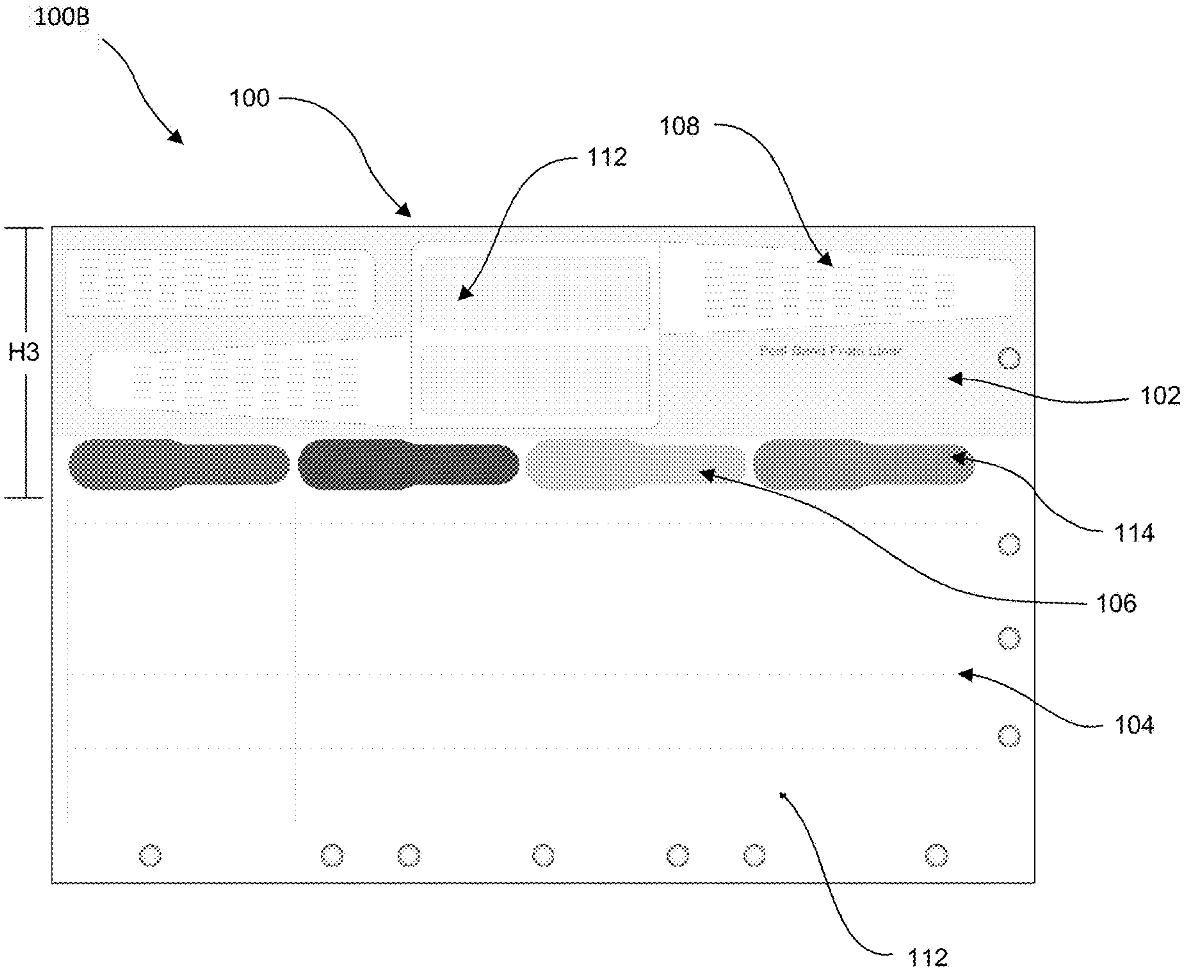
FIG. 5 is a back view of a wristband, chart label, and alert label form, according to an embodiment of the present disclosure.

FIG. 5 shows an embodiment of a wristband and chart label form 100 in accordance with the present disclosure. Specifically, FIG. 5 shows the back side 100B of the form 100. The form 100 is similar to the form 10 shown in FIGS. 1 and 2, with additional features. The form 100 is divided into an upper section 102 and a lower section 104; the upper section and the lower section being divided by a line of weakness or perforation 106. The label form 100 may be constructed of two or more plies (e.g., paper and/or polyester plies) secured together, such as through adhesive.

The upper section 102 may be formed from polyester or a similar synthetic material, and the lower section 104 may be formed from paper forming a paper liner. The upper section 102 may include a wristband 108 which is die cut into the polyester and is removeable from the form 100. The upper portion 102 may also include a wristband extender 110, which is similarly die cut into the polyester and removeable from the form. On the front side (not shown) of the form 100, there may be indicia in the form of an outline of the wristband 108. Additionally, the front side may include a plurality of chart labels (not shown) which may be arranged in a grid pattern, similar to the chart labels in FIGS. 1-4. The chart labels located on the front side may be releasably secured to the paper liner lower section 104 using adhesive and a release material (e.g., silicone).

The form 100 includes a printable area 112 contained within indicia outlining a wristband 108. The printable area 112 can be printed upon (e.g., by an inkjet printer or similar device) from the back side of the form 100, and when the wristband 108 is disassociated from the form 100, the printed area is simultaneously disassociated with the form 100. The printable area 112 is preferably located in a central portion of the wristband 108.

Compared to the polyester sections of prior art forms 10 and 50, the polyester upper section 102 of form 100 may comprise a larger area, wherein the height of the polyester section 102 is H3, and H3 is larger than H1 and H2, respectively. This increased area and height may be used to incorporate additional labels 114 into the polyester section 102, thereby negating or reducing the need for separate label forms as would be required in the prior art. Specifically, as shown, the form 100 includes alert and/or blood labels 114 defined in the polyester section beneath the wristband 108 by die cuts. The alert labels may, be color coded to convey risk information (e.g., to indicate varying severity or types of risk), or in other ways demarcated such that they can be easily distinguished by medical staff or other users. While FIG. 5 shows the form 100 has four alert labels 114, the artisan will understand that any number of alert labels 114 may be provided, and that they may be sized as desired. Likewise, the illustrated embodiment shows the alert labels arranged horizontally, one of skill in the art will appreciate that the various alert labels 114 may be oriented in any number of layouts or patterns, such as vertically aligned or in a grid pattern.

The alert labels 114 may be fashioned from polyester or a similar synthetic material, and may be die cut in the polyester and may be removably coupled to the inboard surface of the front side of the form 100 by adhesive and a release material. In existing forms, the additional alert labels, which are typically provided separately from the wristband and chart label form, are made from paper. The polyester alert labels 114 of the present disclosure have increased durability relative to the paper alert labels of the prior art. Further, providing the labels on the same form comprising the wristband and chart labels may increase efficiency and decrease the likelihood of a mismatch.

The alert labels 114 may include any number of indicia for identifying or classifying various information relating to a patient and/or a patient's medical status. Therefore, in some embodiments, the alert labels 114 may be formed from a material suitable for printing the indicia. For example, the alert labels may signify a patient's test results, using text and/or a barcode. Alternatively, the alert labels 114 may be in the form of blood bands or convey similar information relating to a person's blood type and/or condition. In other embodiments, the alert labels may be color-coded or patterned such that it is not necessary to print any additional indicia upon them.

In some embodiments, the height of the polyester section H3 may be extended to cover greater than 50% of the area of the back side of the form 100. In further embodiments, the entire back side of the form 100 may be formed from polyester.

In some embodiments not shown, including those in which the entire back side is formed of a polyester ply, alert labels, chart labels, blood labels, et cetera, may additionally or alternatively also be provided on the front side of the form 100. Thus, an artisan will understand that any of the alert labels, chart labels, blood band labels, et cetera, may be made of polyester and/or paper, and may be located on the front side or the back side of the form 100.

Figure 6:
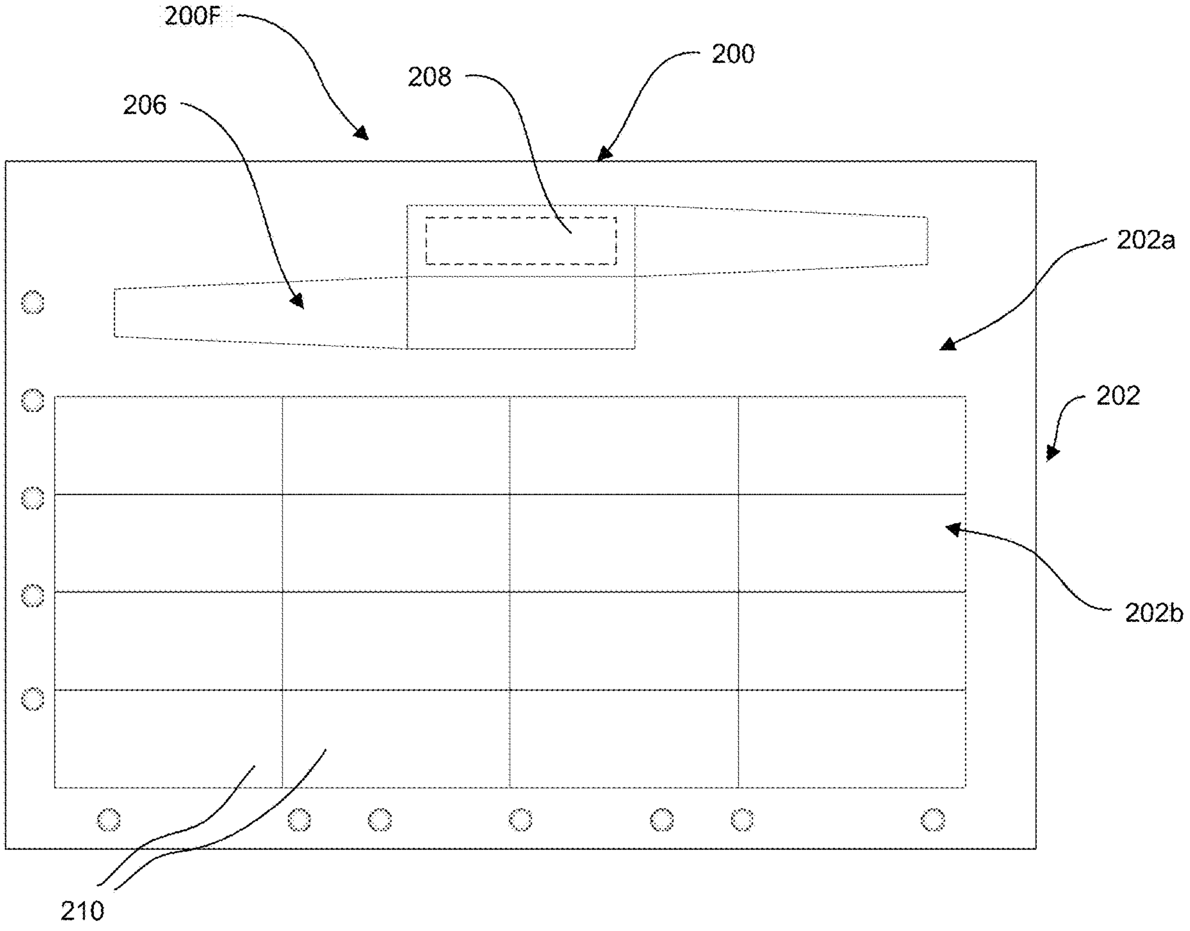
FIG. 6 is a front view of a wristband, chart label, and alert label form, according to another embodiment.
Figure 7:
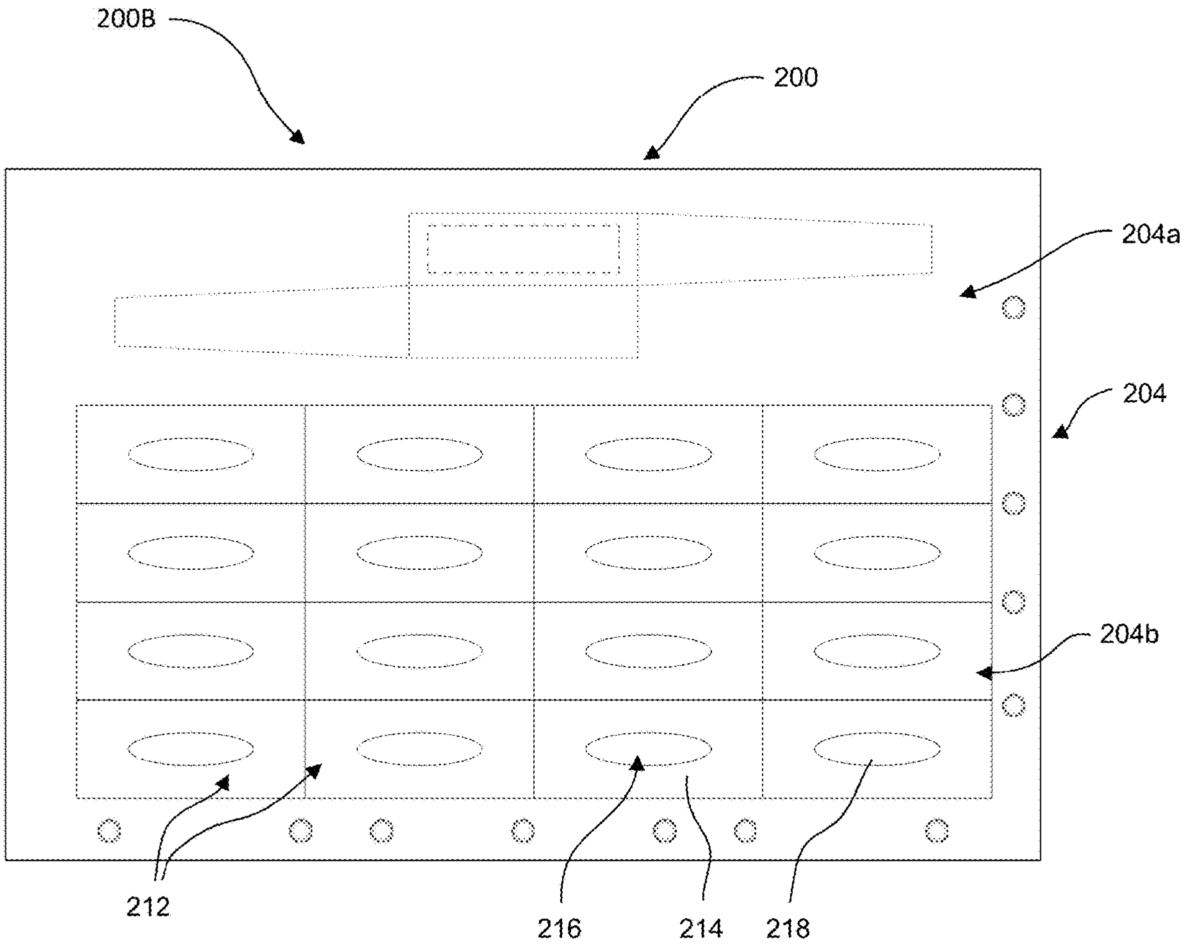
FIG. 7 is a back view of the form of FIG. 6.

FIGS. 6 and 7 show another embodiment of a wristband and chart label form 200 having multiple plies. Specifically, FIG. 6 shows a front side 202 of a first ply 200F, having an upper portion 202*a* and a lower portion 202*b*. The upper portion 202*a* includes indicia related to the outline of a wristband 206, which itself may be located primarily on the back side 204. Wristband 206 includes a first printable area 208 upon which indicia may be printed from the front side. The wristband 206 may have a central portion which includes the printable area 208, and a pair of straps, each extending from opposing sides of the central portion. The straps may be substantially trapezoidal in shape, as shown in the illustrated embodiment, although an artisan will appreciate that the straps may be other shapes without departing from the scope of the disclosure. The wristband 206 may be formed from a synthetic material, for example polyester. The printable area 208 may be polyester with a printable coating, or may be made from paper.

The lower portion 202*b* of the front side 202 includes a plurality of chart labels 210, which may be arranged in a grid pattern. The chart labels 210 may be formed from paper, and may be releasably coupled to the back side 204 of the form 200.

FIG. 7 shows a back side 204 of a second ply 200B. In the illustrated embodiment, the entire back side is formed from a polyester ply, although one skilled in the art will appreciate that in some embodiments, only a portion of the back side 204 may be formed from polyester or a similar synthetic material. The back side 204 has an upper portion 204*a* and a lower portion 204*b*, with the upper portion 204*a* having a wristband that is die cut in the polyester ply and is removable from the form 200.

The lower portion 204*b* comprises a plurality of compound or combination elements 212. Each compound element 212 comprises polyester and has a release liner area 214 and a label area 216. In embodiments, the compound element 212 may alternately or additionally comprise paper material. In the illustrated embodiment, one label area 216 is die cut into each compound element 212, though an artisan will understand that some compound elements might comprise multiple label areas 216 or may be devoid of label areas altogether.

The label area 216 may, in some embodiments, comprise an alert and/or blood label 218. As such, one label area 216 may be color coded and/or sized differently from another label area 216. The alert label 218 may be die cut in the compound element 212 (e.g., such that a perimeter of the alert label 218 is entirely surrounded by the release liner area 214) and may be removable therefrom. In embodiments, a portion of adhesive may remain affixed to the alert labels 218 after the labels 218 are removed from the form 100, which may allow the alert labels 218 to be re-adherable (i.e., the alert labels 218 may be secured to another surface after being separated from the form 100). The plurality of compound elements 212 on the back side 204 may generally correspond to and be in alignment with the plurality of chart labels 210 on the front side. That is, each compound element 212 may serve as a liner for a corresponding chart label 210. However, in other embodiments, the chart labels and the compound elements may be differently sized and/or offset such that one compound element 212 may serve as the liner for multiple chart labels 210 and/or one chart label 210 may employ multiple compound elements 212 as a liner.

The die cut forming the alert labels 218 may not extend through the chart labels 210 on the front side 202. One or more layers of adhesive and silicone may be provided on an inboard surface of the compound elements 212 and the chart labels 210 (e.g., between the plies 200F and 200B) to allow each of the chart labels 210 and the alert labels 218 to be releasably secured to the form 200. Where a chart label 210 is removed from the front side 202 for use, the compound element 212 may remain in place on the back side 204. Alternatively, where an alert label 218 associated with a particular compound element 212 is removed therefrom along the die cuts, the chart label 210 on the front side 202 may remain intact by virtue of the release area 214 of that compound element 212 that remains in place. Thus, the chart label 210 may thereafter be removed from the form 200 for use. In this way, by creating the entire back side 204 with polyester, the label area 216 thus formed may serve as a liner for the chart labels 210 on the front side 202 and, in addition, allow for additional labels (e.g., alert labels 218) to be included on the back side 204—without the need to add additional plies.

While the disclosure focuses on the combination elements 212 having alert labels 218 die cut therein, the artisan will understand that other labels may likewise be incorporated into the combination elements 212. It would be understood that any feature, layer, or component of the forms 100 and 200 may be made of any desired material, such as paper, polyester, or a combination of paper and polyester.

In yet another embodiment (not shown), a polyester liner ply with adhesive and silicone on both sides may be added as the middle ply of the form. In these embodiments, the polyester liner ply may serve as the liner for elements both on the front side and the back side. For instance, one surface of the central polyester liner ply may serve as the liner for the chart labels, and the opposite surface of the central polyester liner ply may serve as the liner for the wristband and alert labels. Further, with the chart labels releasably secured to the central polyester liner ply, this may provide additional space beneath the wristband and the alert labels on the back side (i.e., space may be freed up because a separate liner beneath the wristband for the chart labels is not required). The back side may thus be constructed entirely of a polyester ply, and blood labels, additional alert labels, additional wristbands, et cetera, may be included. Thus, wristbands, chart labels, alert labels, and blood bands may be provided on the same form, thereby increasing efficiencies and reducing likelihood of mismatch. More specifically, chart labels (and, in embodiments, the printable area of the wristband may be provided on the front side), and the wristband, alert labels, blood labels, and/or additional chart labels may be provided on the back side. Of course, a central liner ply may be incorporated in the prior art forms shown in FIGS. 1 through 4, and also to other prior art forms, together with the various modifications described herein. The artisan will understand the techniques described herein are applicable primarily with laser printable wristband forms.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

The disclosure claimed is:

1. A business form comprising:

a first ply having a first ply upper portion and a first ply lower portion;

a second ply coupled to the first ply, the second ply having a second ply upper portion and a second ply lower portion;

a wristband die cut into the second ply upper portion, the wristband having a central portion and a strap portion, the wristband being releasably secured to the first ply upper portion;

a printable area disposed on the central portion;

a plurality of compound elements located in the second ply lower portion, each compound element of the plurality of compound elements comprising a release liner area and a die cut label area, the label area having an alert label disposed thereon, the alert label being bounded by the release liner area; and a plurality of chart labels disposed on the first ply lower portion, the plurality of chart labels being releasably secured to the form:

wherein:

the second ply lower portion is made of polyester;

at least a portion of the first ply lower portion is made of paper; and the plurality of compound elements is generally offset from the plurality of chart labels, such that each of the plurality of compound elements acts as a liner for multiple chart labels.

2. The form of claim 1, further comprising a layer of adhesive and a layer of release material located such that the chart labels and the alert labels are independently releasably secured to the form.

3. The form of claim 1, wherein the plurality of compound elements is configured to act as a liner for the plurality of chart labels by being in substantial alignment with the plurality of chart labels.

4. The form of claim 1, wherein the second ply upper portion further comprises a die cut wristband extender.

5. The form of claim 1, further comprising a selection of blood labels in one of the first ply and the second ply.

6. A medical form for conveying information related to a medical patient, the form comprising:

a first side having a first side upper portion and a first side lower portion;

a second side having a second side upper portion and a second side lower portion;

a wristband wearable by a medical patient, the wristband being die cut into the second side upper portion, the wristband having a central portion and a strap portion;

a first printable area disposed in the central portion on the first side;

a plurality of alert labels disposed on the second side, each of the plurality of alert label corresponding to a characteristic of a user and being selectively detachable from the form; and a plurality of chart labels disposed on the first side lower portion, each of the plurality of chart labels being releasably secured to the form;

wherein:

at least the second side upper portion is made of polyester;

wherein the plurality of alert labels comprise polyester, and wherein each of the plurality of alert labels generally corresponds to and is aligned with a chart label of the plurality of chart labels.

7. The form of claim 6, wherein the plurality of alert labels is made of polyester.

8. The form of claim 6, wherein the plurality of alert labels is made of paper.

9. The form of claim 6, wherein the plurality of alert labels is configured to receive printable indicia.

10. The form of claim 6, further comprising a second printable area disposed on the central portion of the wrist-band on the second side.

11. The form of claim 10, wherein the first printable area is made of paper.

12. The form of claim 10, wherein at least one of the first printable area and the second printable area is comprised of a polyester ply and a printable coating applied to the polyester ply.

13. The form of claim 6, further comprising indicia disposed on the plurality of alert labels, wherein the indicia is at least one of a medical test result and a barcode.

* * * * *